United States Patent
Ishibe et al.

(10) Patent No.: US 8,226,751 B2
(45) Date of Patent: Jul. 24, 2012

(54) COMPOSITE MEMBRANE MATERIAL FOR HYDROGEN SEPARATION AND ELEMENT FOR HYDROGEN SEPARATION USING THE SAME

(75) Inventors: Hideomi Ishibe, Hirakata (JP); Hiroyasu Taga, Hirakata (JP)

(73) Assignee: Nippon Seisen Co., Ltd., Osaka (JP)

( * ) Notice: Subject to any disclaimer, the term of this patent is extended or adjusted under 35 U.S.C. 154(b) by 642 days.

(21) Appl. No.: 11/992,658

(22) PCT Filed: Sep. 15, 2006

(86) PCT No.: PCT/JP2006/318411
§ 371 (c)(1),
(2), (4) Date: Aug. 21, 2009

(87) PCT Pub. No.: WO2007/040034
PCT Pub. Date: Apr. 12, 2007

(65) Prior Publication Data
US 2010/0018397 A1    Jan. 28, 2010

(30) Foreign Application Priority Data

Sep. 30, 2005 (JP) ................ 2005-286021
Sep. 8, 2006 (JP) ................ 2006-244497

(51) Int. Cl.
*B01D 53/22* (2006.01)
(52) U.S. Cl. ........... 96/11; 96/4; 96/9; 95/55; 95/56; 55/498; 55/501; 55/521; 422/218; 422/239; 423/230; 423/247; 423/651
(58) Field of Classification Search ............ 96/4, 9, 96/11; 95/45, 55, 56; 55/498, 500, 501, 55/505, 521, 524, 525; 422/211, 218, 222, 239; 423/230, 247, 651
See application file for complete search history.

(56) References Cited

U.S. PATENT DOCUMENTS

| | | | | |
|---|---|---|---|---|
| 3,238,704 A | * | 3/1966 | Lopez et al. | 96/11 |
| 3,266,223 A | * | 8/1966 | Dresser et al. | 55/501 |
| 3,447,288 A | * | 6/1969 | Novack et al. | 96/11 |
| 4,699,637 A | * | 10/1987 | Iniotakis et al. | 96/10 |
| 5,266,279 A | * | 11/1993 | Haerle | 55/525 |
| 6,183,542 B1 | * | 2/2001 | Bossard | 96/11 |
| 6,267,801 B1 | * | 7/2001 | Baake et al. | 95/56 |

(Continued)

FOREIGN PATENT DOCUMENTS
GB    2 355 418 A    4/2001
(Continued)

*Primary Examiner* — Jason M Greene
(74) *Attorney, Agent, or Firm* — Birch, Stewart, Kolasch & Birch, LLP (57) ABSTRACT

A composite membrane material characterized by comprising a hydrogen-permeable membrane which is selectively permeable to hydrogen and is formed by rolling to a thickness of 30 μm or less which is difficult for the membrane by itself to retain its shape, and a shape-retention mesh which is disposed on at least one side of the hydrogen-permeable membrane and is composed of a wire of a high-melting metal which does not cause thermal diffusion into the hydrogen-permeable membrane, wherein the hydrogen-permeable membrane and the shape-retention mesh are superposed and subjected to a pleat processing in a non-bonded state so that they are separable and the hydrogen-permeable membrane has a surface area increased at least 3 times per unit area. This material is used to constitute a hydrogen separation element.

18 Claims, 6 Drawing Sheets

U.S. PATENT DOCUMENTS

6,866,693 B2 * 3/2005 Igarashi .................. 55/525

FOREIGN PATENT DOCUMENTS

| | | | |
|---|---|---|---|
| JP | 41-001609 B1 | | 2/1966 |
| JP | 60-097024 A | | 5/1985 |
| JP | 61-57159 U | | 4/1986 |
| JP | 61-57159 U | * | 4/1986 |
| JP | 8-318142 A | | 12/1996 |
| JP | 2000-005580 A | | 1/2000 |
| JP | 2001-29761 A | | 2/2001 |
| JP | 2002-3204 | * | 1/2002 |
| JP | 2002-003204 A | | 1/2002 |
| JP | 2002-239353 A | | 8/2002 |
| JP | 2003-192302 A | | 7/2003 |

* cited by examiner

COMPOSITE MEMBRANE MATERIAL FOR HYDROGEN SEPARATION AND ELEMENT FOR HYDROGEN SEPARATION USING THE SAME

TECHNICAL FIELD

The present invention relates to a composite membrane material for hydrogen separation which can be used for separation of high-purity hydrogen by selective permeation of hydrogen gas from a hydrogen-containing mixed gas, and an element for hydrogen separation using the same.

BACKGROUND ART

For production of hydrogen as an energy source for the next generation are known, for example, a process by electrolysis of water, and a process for obtaining hydrogen by steam reforming of various raw gases such as methanol, propane gas, liquefied natural gas and city gas. In particular, in the latter process, a mixed gas containing hydrogen gas is obtained by reforming and conversion of these gases. However, for utilizing the hydrogen gas as a fuel to generate electricity, it is required to separate a hydrogen gas having a high purity of 99.99% or more.

Figure 8:
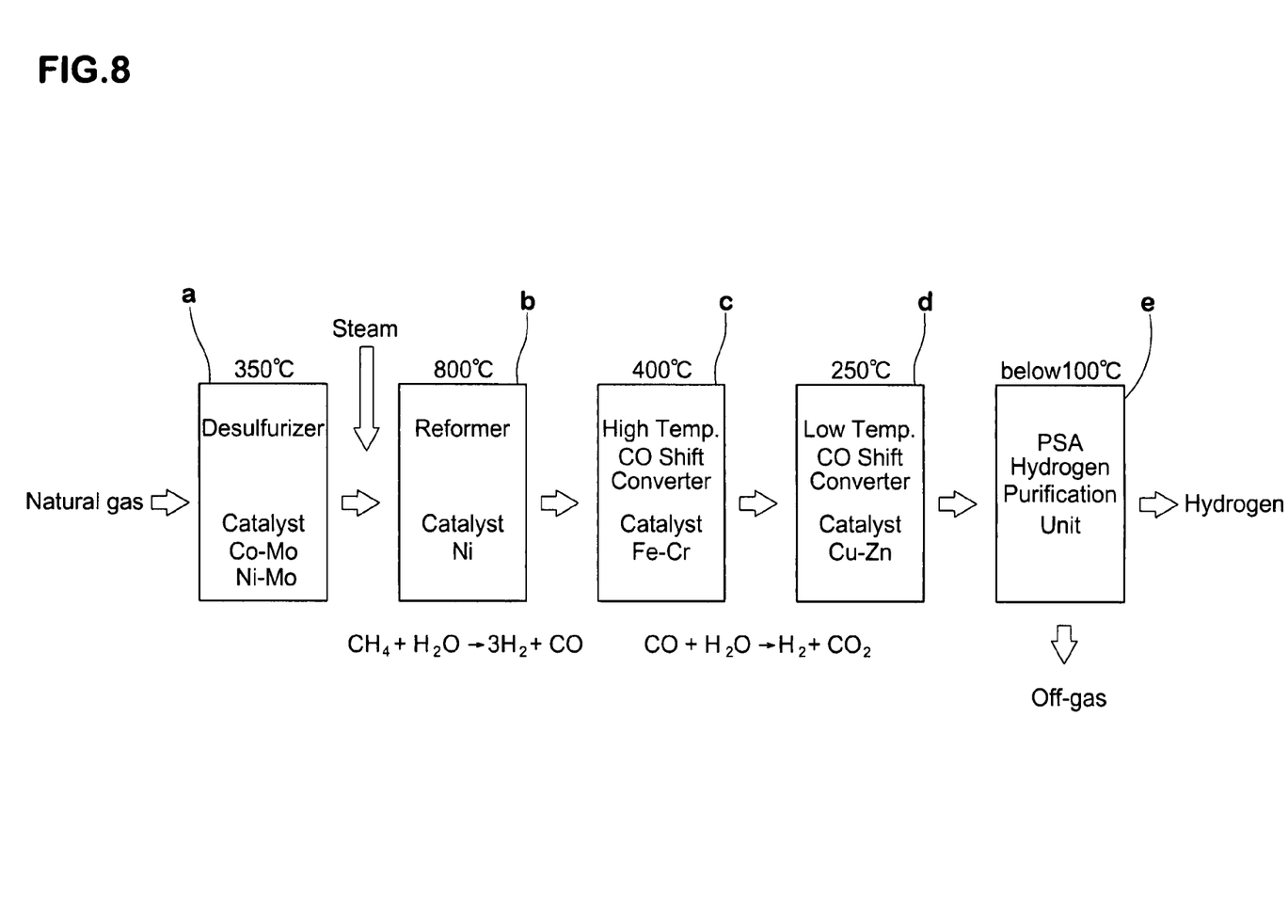
FIG. 8 is a block diagram illustrating a conventional process for producing hydrogen.

When a natural gas is used as a raw gas, the following hydrogen separation process is used as shown in FIG. 8. After desulfurizing in a desulfurizer "a" at 350° C., the natural gas is passed through a reformer "b" at 800° C. to which steam for reforming is introduced, a high temperature CO shift converter "c" at 400° C., and a low temperature CO shift converter "d" at 250° C. to produce hydrogen, and the hydrogen is taken out of a PSA unit "e" (hydrogen purification apparatus by catalyst adsorption) at 100° C. or less.

However, in this process using the PSA, the equilibrium reaction temperature is as high as about 800° C. Further, in addition to complexity and size increase of plant itself and increase in process steps and number of equipments, the plant cost is high and the maintenance of plant is troublesome. Moreover, the purity of the obtained hydrogen gas is not satisfactory and, therefore, improvement of this process is desired also from the viewpoint of hydrogen gas purification efficiency, so the process has not sufficiently spread.

Figure 9:
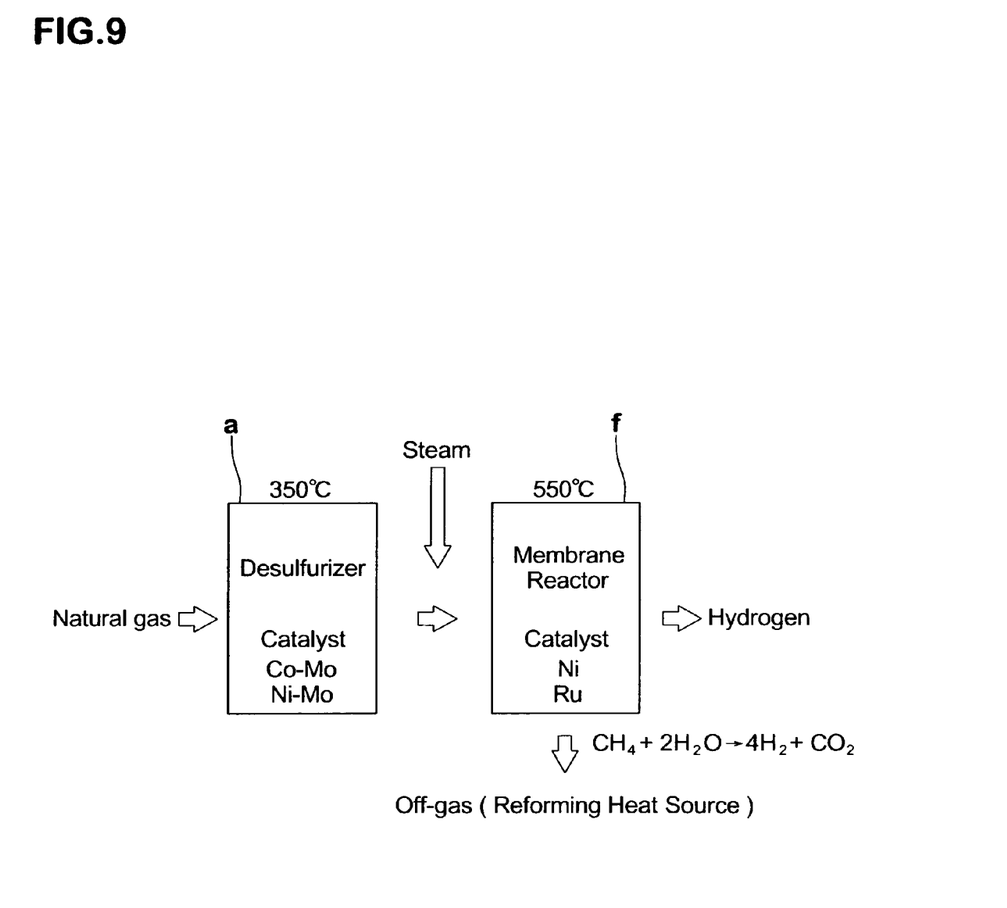
FIG. 9 is a block diagram illustrating a process for producing hydrogen using a membrane reactor.

As a process capable of solving these problems is recently known a process in which steam reforming of a raw gas is carried out in a downstream of the desulfurizer "a" as shown in FIG. 9. After this reforming, a high purity hydrogen gas is obtained in a membrane reactor "f" using a hydrogen separation membrane. According to this system, a low temperature of, for example, about 550° C. is sufficient for reforming since catalysts are used and a non-equilibrium reaction occurs. For example, in case of using natural gas as a raw gas, the reforming proceeds according to a reaction of $CH_4 + 2H_2O \rightarrow 4H_2 + CO_2$, and hydrogen and off-gas (carbon dioxide) are separated and taken out.

Like this, hydrogen can be purified and separated through two steps from an introduced raw gas and steam, and the off-gas is also taken out and reused to utilize its temperature. In this process, the hydrogen separation unit using the membrane reactor "f" can be operated at a relatively low temperature. Thus, an apparatus for this process can be greatly downsized and simplified as compared with apparatuses for a conventional process, and it can be utilized as an on-site apparatus such as an apparatus for use at gas stations. It is also expected to utilize it as a high purity hydrogen generator for fuel cells.

A hydrogen separation element in such an apparatus is disposed so that a hydrogen-permeable membrane in the form of a thin film or membrane made of Pd which is known as a metal selectively permeable to hydrogen, or its alloy is located on the raw gas side. This hydrogen-permeable membrane is usually supported by a porous support. Hydrogen gas separated by the hydrogen-permeable membrane is taken out outwardly through the support. Therefore, the support withstands a pressure of fed gas applied to the hydrogen-permeable membrane and prevents the membrane from deforming. It is also used as a flow passage member for well flowing down the separated hydrogen gas.

As to such hydrogen separation members, a hydrogen-permeable membrane is directly formed on a porous support by a method such as electrolytic plating, electroless plating or chemical vapor deposition method. It is known, for example, from Patent Literature 1 that according to such a method, the hydrogen separation efficiency per unit volume (volumetric efficiency) can be increased. It is also disclosed, for example, in Patent Literature 2 that a gas separation membrane having a surface area increased to improve the treatment amount is obtained by forming an inorganic porous or organic membrane support having a large number of concave and convex portions by using a mold prepared by electroforming, and then applying electroless plating to the surface of the membrane support to form a separation membrane thereon.

Further, in Patent Literature 3 is proposed a separator having an improved durability to high temperature and high pressure together with a high flux capacity and a low cost performance, which is prepared by using a mesh screen as a supporting structure, superposing a hydrogen separation foil on the screen, pressing it by a roller or the like to follow the undulated concave-convex surface of the mesh, and joining them at the contact portions thereof.

Patent Literature 1: JP-A-2002-239353
Patent Literature 2: JP-A-2001-29761
Patent Literature 3: JP-A-2001-162144

DISCLOSURE OF THE INVENTION

Problem to be Solved by the Invention

However, in case of the separation membrane disclosed in the Patent Literature 1, a hydrogen-permeable membrane is formed on the outer surface of a porous support which has an irregularity on the surface, by a surface treatment method such as electroless plating or ion plating. Therefore, it is difficult to increase the adhesion strength between the porous support and the hydrogen-permeable membrane. Also, partial fatigue breakdown phenomenon (cracking, peeling from support, etc.) of the permeation membrane is easy to occur by repeated expansion and shrinkage of the separation membrane which occurs owing to absorption and desorption of hydrogen gas or heating and cooling. Further, since the permeation membrane is formed on a rough surface of a porous support, it is difficult to improve the quality stability and production yield of the permeation membrane.

Further, the separator proposed in Patent Literature 2 is only a separator in which a permeation membrane itself is prepared to have an irregular surface and a space formed by superposing the membrane on a flat support is utilized as a hydrogen gas flow passage. On the other hand, in the gas separator proposed in Patent Literature 3, the foil forms an undulated surface which extends along the texture of the support (wire mesh screen), and it can follow even expansion and shrinkage of the separation membrane which occurs when the foil is exposed to a hydrogen gas stream. As a production method, it is disclosed for example to integrate the foil and the screen by pressing or roller processing under a pressure of about 3.1 to about 11 tons/cm². This technology is also based on joining a support and a permeation membrane into an integrated body. Therefore, there cannot be prevented a partial fatigue breakdown phenomenon (cracking, etc.) of the permeation membrane which originates from the joining and occurs by repeated expansion and shrinkage of the separation membrane. In particular, since a screen is used as a support, there is a risk of damaging a thin foil material when pressing the foil onto the support, thus rather causing another quality defect.

Like this, the gas separation membranes disclosed in the prior art mentioned above all are of the type that a permeation membrane is exposed to the surface and is supported by bonding to a support disposed on the downstream side (secondary side) of the membrane. Therefore, attention is required in prevention of damage of the permeation membrane owing to careless handling or supply pressure of raw gas, prevention of cracking owing to expansion and shrinkage of the permeation membrane and prevention of performances from deteriorating by diffusion resulting from contact between the permeation membrane and the support. Further, these gas separation membranes have to have a processability for attaching to a mechanical apparatus. Therefore, it is hard to say that these gas separation membranes are satisfactory. Moreover, since a hydrogen-permeable membrane is fixed to a support, it is difficult to recycle only the permeation membrane when disposing of the gas separation membranes.

Accordingly, it is an object of the present invention to provide a composite membrane material for hydrogen separation having a high quality and a long life, in which a thin hydrogen permeation membrane which is hard to retain its shape by itself against a fed gas pressure, is laminated with a shape-retention mesh made of a high melting metal along the membrane in a nonbonded state and is provided with waved pleats to thereby increase the hydrogen permeation amount per unit area and prevent occurrence of defects such as cracking of the permeation membrane owing to heating and cooling; and according to which the recovery performance for recycling of only a hydrogen permeation membrane which is expensive can be enhanced.

Means to Solve the Invention

The invention as claimed in claim 1 of the present application is directed to a composite membrane material for hydrogen separation comprising:

a hydrogen-permeable membrane selectively permeable to hydrogen which is formed by rolling to a thickness of 30 μm or less which is difficult for the membrane by itself to retain its shape, and a shape-retention mesh for retaining the shape of the hydrogen-permeable membrane, which is disposed on at least one side of the hydrogen-permeable membrane and which comprises a wire of a metal selected from high-melting metals which have a high melting point and do not cause thermal diffusion into the hydrogen-permeable membrane, wherein the hydrogen-permeable membrane and the shape-retention mesh are superposed and subjected to a pleat processing to provide pleats continuously so that the S/So ratio is from 3 to 10 in which So is an area of a datum plane passing through the middle points in height of the pleats of the hydrogen-permeable membrane at the average height, and S is a surface area of the hydrogen-permeable membrane within the datum plane.

The invention as claimed in claim 2 is characterized in that the high-melting metals of the shape-retention mesh are metal wires having a melting point of not less than 2,000° C. The invention as claimed in claim 3 is characterized in that the high-melting metals of the shape-retention mesh are metal wires of molybdenum having a thickness of at most 0.3 mm. The invention as claimed in claim 4 is characterized in that the pleats have a peak height H of 5 to 30 mm in the cross section thereof, and the pitch P which is a length of a straight line connecting the middle points in height of adjacent pleats is not more than 0.8 time the peak height.

The invention as claimed in claim 5 is directed to an element for hydrogen separation using the composite membrane material for hydrogen separation of any one of claims 1 to 4, which is characterized in that it comprises a porous inner cylinder, the composite membrane material which is fitted onto the porous inner cylinder and is pleated at a prescribed pitch, and a porous outer cylinder wrapping the pleated composite membrane material.

The invention of claim 6 is characterized in that the porous outer cylinder and/or the porous inner cylinder are made of a punched plate or a wire mesh. The invention of claim 7 is characterized in that a connecting fitting is provided on at least one end face of the cylindrical element. The invention of claim 8 is characterized in that a catalyst is disposed in a noncontact state with the hydrogen-permeable membrane through the interposing shape-retention mesh in a space which is located on a primary side into which a mixed gas from which hydrogen is separated through the hydrogen-permeable membrane is introduced, and is located between the porous outer cylinder or porous inner cylinder and the shape-retention mesh.

Effects of the Invention

In the invention of claim 1 is used a hydrogen-permeable membrane which cannot withstand a supply pressure of a raw gas by itself and which is difficult to retain its shape. A shape-retention mesh is superposed along the hydrogen-permeable membrane to reinforce it. It is superposed in a nonbonded state which does not cause bonding by thermal diffusion, and the hydrogen permeation area is increased to 3 to 10 times by pleating. Therefore, the pleated shape can be effectively maintained and the hydrogen separation treatment efficiency can be greatly increased. Since a high-melting metal is used for the shape-retention mesh, diffusion into the charged catalyst powder mentioned above or other metal parts and its influence on deterioration of performances can be prevented. Further, since a composite membrane material having a long life and a high accuracy is provided, it is possible to effectively utilize it for hydrogen separation.

In the present invention, the shape-retention mesh and the hydrogen-permeable membrane are stacked in a nonbonded state. Therefore, even in the case that the hydrogen-permeable membrane itself expands or shrinks owing to heating or cooling, it can be relatively freely displaced and, therefore, defects such as cracking can be prevented from occurring. Since the both are simply stacked in an nonbonded state, the composite membrane material has the advantage that only expensive hydrogen-permeable membrane can be easily separated, recovered and reused.

As a hydrogen-permeable membrane is used a thin membrane material prepared from a sheet or board material or a block piece by rolling it into a predetermined thickness. Therefore, the thin membrane material has a uniform quality as compared with a conventional thin membrane prepared by a method such as a plating method or the like, and is provided as a thin membrane material of good quality free of holes or pores.

Further, according to the invention of claims 2 to 4, the shape-retention mesh is constituted by a metal wire material having a melting point of not less than 2,000° C. which is greatly different from that of the hydrogen-permeable membrane and, therefore, thermal diffusion between them can be prevented, whereby the hydrogen separation performance of this membrane material can be prevented from lowering. In particular, the shape-retention mesh made of a molybdenum metal has the features that it has a sufficient rigidity and, moreover, spring back is small when conducting a pleating processing. As a result, pleats can be easily imparted to the hydrogen-permeable membrane. After such shaping, the mesh can support the hydrogen-permeable membrane with keeping a high elasticity. Therefore, such a shaping property enables to use a thinner wire material. Thus, it is possible to have a sufficient gas flow passage, and it is possible to increase the reaction area on the surface of the hydrogen-permeable membrane. In addition, it is possible to design a large pleat shape.

Further, according to the invention of claim 5, the composite membrane material for hydrogen separation provided with pleats at a predetermined pitch is fitted onto the peripheral surface of a porous inner cylinder, and its outside is concentrically covered with a porous outer cylinder. As a result, in addition to the above-mentioned action and effect of the composite membrane material that the effective treatment area per unit area is increased, the composite membrane material is strongly supported by the porous inner cylinder. Further, since the outer surface of the composite membrane mate is covered with the porous inner cylinder, there is no surface exposure of a thin composite membrane, and handling is easy. Downsizing of the element itself is achieved, and the hydrogen separation performance is greatly improved. Moreover, in the present invention, there is no need of using an expensive porous sintered body which has been used in the case of a conventional plating treatment, and accordingly the invention can be inexpensively practiced with a light weight.

Further, according to the invention of claims 6 and 7, the porous outer cylinder and the porous inner cylinder can be constituted by a perforated steel plate, e.g., a punched plate or a rough wire mesh. Therefore, it is possible to provide an inexpensive hydrogen separation element. Further, the composite membrane material is provided on its surface with a shape-retention mesh of a high-melting metal and, therefore, even in the case that the composite membrane material comes into direct contact with the porous inner cylinder or the porous outer cylinder, the hydrogen-permeable membrane itself can be isolated from the porous inner or outer cylinders by the mesh. Therefore, mutual diffusion between materials and deterioration of performances caused thereby can be prevented. Further, it is possible to easily attach the hydrogen separation element to an equipment main body by providing a joint for connection on one end face of the element in the length direction thereof as in the invention of claim 7. Also, for example, a plurality of the elements can be connected to give a large capacity apparatus. Further, the hydrogen separation performance can be enhanced by disposing a catalyst on the primary side of the element as in the invention of claim 8. Further, the catalyst does not come into contact with the separation membrane, a thermal reaction is prevented to prevent the life from lowering.

EXPLANATION OF SYMBOLS

1. Composite membrane material
2. Hydrogen-permeable membrane
3. Shape-retention mesh
10. Hydrogen separation element
11. Porous inner cylinder
12. Porous outer cylinder
15. End fitting
15A. Connecting fitting
15B. Sealing fitting

BEST MODE FOR CARRYING OUT THE INVENTION

A preferable embodiment of the present invention will now be explained with reference to the accompanying drawings.

Figure 1:
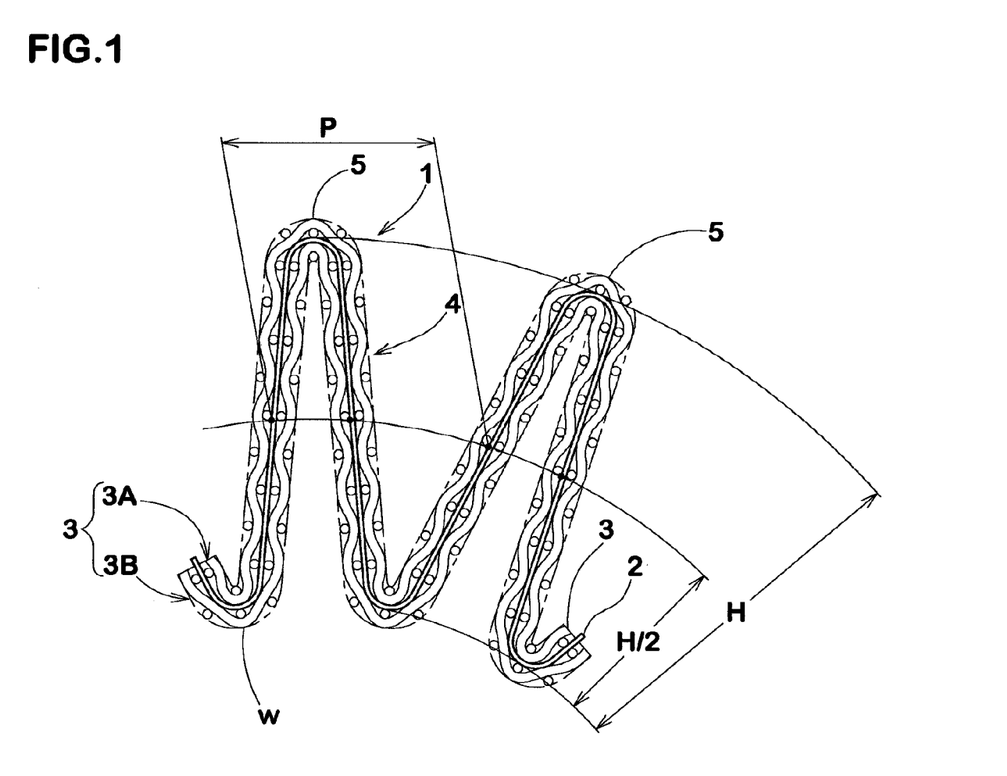
FIG. 1 is an enlarged partial cross sectional view of a composite membrane material for hydrogen separation according to the present invention.

FIG. 1 is an enlarged cross sectional view showing a part of a composite membrane material 1 according to the present invention. In this embodiment, the composite membrane material 1 includes a hydrogen-permeable membrane 2 which is selectively permeable to hydrogen, and shape-retention meshes 3 disposed on both the inner and outer surfaces of the hydrogen-permeable membrane 2. The shape-retention meshes 3 are woven out of a high-melting metal wire "w". The hydrogen-permeable membrane 2 and the shape-retention meshes 3 are superimposed in a nonbonded state, and are pleated together into a desired shape to form them into a waved shape having mountain or ridge parts 5 which extend in a given direction (in a length direction in this embodiment).

The hydrogen-permeable membrane 2 is selected from metal materials having a hydrogen permeability, e.g., Pd and Pd alloys such as Pd—Cu and Pd—Ag. The thickness of the hydrogen-permeable membrane 2 is 30 μm or less which is difficult for the membrane by itself to retain its shape (for example, 2 to 30 μm, preferably 5 to 20 μm). As a hydrogen-permeable membrane 2 is used a rolled membrane formed by applying pressure to a sheet or board material or a block by means of a roll or a press.

It is known that these Pd metal and Pd alloys have a function selectively permeable to only hydrogen. The principle thereof is described in various literatures, including for example a science magazine "Kino Zairyou (Functional Materials)", No. 4, pages 76-87, 2003. It has been considered that if a hydrogen molecule comes into contact with a Pd membrane or film, it is dissociated at that moment to ionize and passes as a proton through the membrane, and when the proton reaches the rear surface of the membrane, it combines with an electron to produce a hydrogen molecule.

In order to accelerate such a phenomenon to thereby improve the hydrogen permeability, durability, hydrogen brittleness resistance or processability, there can be used Pd alloys in which 10% by weight or more, preferably 20 to 50% by weight, of at least one metals selected from Cu, Ag and Au is incorporated into Pd. For other purposes, it is also possible to use a trace amount of a third element in combination with these metals. Examples of the third element are, for instance, Group VIII elements such as Pt, Rh, Ru, In, Fe, Ni and Co, and Group VIa elements such as Mo. At least one of these elements is used as a third element. The content of the third element is at most 5%. For example, Pd—Ag alloys containing 20 to 45% of Ag exhibit an enhanced hydrogen permeability. Further, when Pd—Cu alloys containing 35 to 45% of Cu are used as a membrane material, the durability is enhanced together with the hydrogen permeability. Further, as other membrane materials, it is also possible to use, for example, V-based metals and V—Ni-based metals, or amorphous materials. The kinds of metal composition and the morphology can be arbitrarily selected as occasion demands.

In order to enhance the hydrogen permeability, it has been usually recommended to form a membrane as thin as possible to thereby shorten the permeation time. However, in case of using an excessively thin membrane material, there is concern that microscopic unavoidable pinholes directly affect the separation accuracy. When a rolled product obtained by rolling a raw material such as a board or block of the above-mentioned metal material is used as measures to prevent the pinholes, internal holes or pores can be decreased or made to fine. Also, when the membrane is formed by melting, for example, unavoidable impurities are decreased so as not to generate a non-metal inclusion. As a melting method are preferred a vacuum melting using cold crucible melting and a high purity melting method such as double melting method. Usually, the thickness is set to at least 2 μm.

Figure 2:
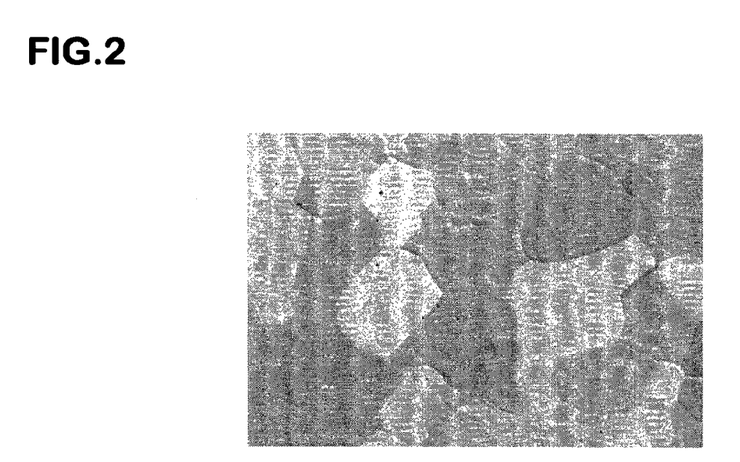
FIG. 2 is a plan view showing a hydrogen-permeable membrane enlarged at a magnification of 1,000 times.

Like this, the quality of the hydrogen-permeable membrane 2 made of a hydrogen-permeable metal is very important. In particular, in case of thin film materials formed by rolling, mechanical properties such as elasticity and toughness are improved with structural stability by this processing and, moreover, generation of defects such as pinholes can be suppressed. The state free of defect is shown in FIG. 2. FIG. 2 is a view enlarged at a magnification of 1,000 times showing a metallic structure of the surface of a hydrogen-permeable membrane prepared by repeating a rolling processing and a heat treatment to give a membrane having a thickness of 20 μm and further heat-treating it at 1,050° C. As observed in this view, the crystal grain size is about 6 to about 20 μm in equivalent diameter, and the structure state is very stable. The term "equivalent diameter" denotes a value obtained from the section area on the assumption that a crystal grain is circular.

Such membrane materials have a good hydrogen permeability and accordingly are preferred. However, they are thin and are difficult to maintain a desired membrane shape by itself. Therefore, in the present invention, they are combined with the shape-retention mesh 3 in a (metallically) non-bonded state, and a desired pleating is applied thereto.

That is to say, even if the hydrogen-permeable membrane 2 is one having a rigidity or an elasticity, the pleated shape can be maintained by the shape-retention mesh 3. The both are superimposed in a non-bonded state. Therefore, even in the case that the hydrogen-permeable membrane 2 itself expands or shrinks owing to heating or cooling, they can relatively easily displace without being restricted. Further, possibility of generation of pinholes or cracking in the hydrogen-permeable membrane 2 can be decreased. Furthermore, as stated above, the surface area ratio per unit area can be increased by pleating.

The shape-retention mesh 3 used in such a way is prepared by weaving a wire of a high-melting metal having a melting point higher than the hydrogen-permeable membrane 2, for example, a melting point of 1,800° C. or more, preferably 2,000° C. or more. This mesh 3 is disposed on at least either one side of the hydrogen-permeable membrane 2. In the embodiment shown in FIG. 1, the meshes 3 are disposed on both sides of the hydrogen-permeable membrane 2. This one side on which the mesh 3 is disposed may be a primary side with respect to the hydrogen-permeable membrane 2 (a side to which a fluid to be treated is introduced being called "primary side" here) or may be a secondary side (a side to which the fluid flows out being called "secondary side" here). In this embodiment, shape-retention meshes 3A, 3B are disposed on the both sides, namely primary side and secondary side, to efficiently and surely retain the shape of pleats 4. As occasion demands, the shape-retention mesh 3 can be disposed on only the secondary side of the separation membrane 2 to ensure supporting for the membrane 2. A typical example of the shape-retention mesh 3 is, for instance, a mesh material obtained by plain-weaving or twill-weaving a fine wire having a diameter of about 0.05 to about 0.4 mm into a mesh of #30 to #100. Other meshes, e.g., stockinet and expanded mesh, can also be used as the shape-retention mesh 3. The aperture can be selected in view of shaping function, function to support the hydrogen-permeable membrane 2, and a function as a covering material for retaining various kinds, of powder when the powder is filled in contact with the shape-retention mesh 3.

Such a metal material having a high melting point prevents mutual diffusion with the hydrogen-permeable membrane 2 which is in contact with it. Further, it prevents mutual diffusion with a catalyst powder mentioned after which is used when the composite membrane material 1 is used in a hydrogen separation element. Even in the case that the metal material is heated in a state contacting the hydrogen-permeable membrane 2 and the catalyst powder, mutual diffusion between them is prevented, and deterioration of performances caused by the mutual diffusion can be prevented. Further, since the shape-retention mesh 3 is made from a metal material, the mesh forming can be easily conducted. Also, since the mesh has a sufficient flexibility, it is suitable as a shape-retention material.

Examples of the high-melting metal are, for instance, a metal such as molybdenum, vanadium, niobium, chromium or tantalum, and an alloy of such a metal with a small amount of a third element (for example, at most 10% by weight of W or $Y_2O_3$). In particular, a mesh of molybdenum or a molybdenum alloy has a very high melting point of about 2,600° C. and, moreover, difference from the melting point of the hydrogen-permeable membrane 2 is not less than 1,000° C. Therefore, mutual diffusion between them can be surely prevented to suppress deterioration of performances. Further, as to the mechanical properties thereof, this mesh has, for example, even in a soft state, a high modulus of elasticity of about 250,000 to about 350,000 $N/mm^2$ and a yield strength of about 400 to about 600 $N/mm^2$. Therefore, when forming pleats, spring back scarcely occurs and the pleating forming can be easily conducted. Further, as to the shape retainability after the forming, the shape can be retained with a high elasticity. Therefore, this mesh has advantages that a finer wire material can be used, and is very useful as a shape-retention mesh 3.

Such hydrogen-permeable membrane 2 and shape-retention mesh 3 are laminated with each other, as mentioned above, in a non-bonded state, and the laminate is pleated at a predetermined pitch to give a composite membrane material 1 according to the present invention.

The number, shape and size of pleats 4 can be suitably determined depending on purposes, hydrogen separation conditions and quality performances such as thickness of hydrogen-permeable membrane 2. In the present invention, it is contemplated to increase the hydrogen permeation area by providing with pleats 4. Further, pleats are formed into a shape capable of withstanding a hydrogen mixed gas to be fed to thereby prevent buckling deformation of pleats. For this purpose, pleats are formed so that the S/So ratio of the surface area S of the hydrogen-permeable membrane 2 to the area So of a datum plane passing through the middle positions of the peak height of the pleats 4 falls within the range of 3 to 10, whereby the effective permeation area can be increased. The term "surface area S" as used herein means a permeation area of the hydrogen-permeable membrane 2. In the case that all pleats 4 have the same shape and the same peak height H, the S/So ratio can be obtained, for example, in FIG. 1, as a length ratio between a pitch length of a circular arc between pitch points at the middle positions of the peak height and a section length of a portion of the hydrogen-permeable membrane 2 which is located within the pitch P. The term "pitch length of a circular arc" denotes a value obtained by converting the pitch P which is a length of a straight line between the pitch points at the middle positions of the peak height, to a circular arc, that is, denotes a length of a circular arc between the pitch points.

As to the term "datum plane", in case that a pleated hydrogen-permeable membrane 2 is in the form of a cylinder as shown in FIGS. 1 to 4, the datum plane denotes a circumference surface of a cylinder having a radius from the center up to the middle position of the peak height. In case that the pleated hydrogen-permeable membrane 2 is in the form of a flat plate, the datum plane denotes a plane passing through the middle positions in height of the pleats. In this case, since the membrane is flat, a unit area on a flat surface is adopted regardless of pleating.

As to the average height in the case of non-uniform shape, for example, in case that the pleats 4 have different heights, the height is denoted by an average value obtained by arbitrarily extracting ¼ or more of all pleats, measuring the heights of the extracted pleats and calculating the average, preferably an average value of the heights of all pleats.

As an example of the size of pleats in which all pleats have the same shape, it is mentioned that the peak height H in cross section is from 5 to 30 mm, and the pitch P of the pleats is from about 3 to about 30 mm. Preferably, the pitch P is not more than about 0.8 time the peak height H, especially 0.2 to 0.7 time the peak height H. In that case, the "peak height H" denotes a height from the top to the valley bottom of a ridge or peak 4 of the hydrogen-permeable membrane 2 (in case of FIG. 1, height in the radial direction). The "pitch P" denotes, as mentioned above, a length of a straight line between the middle positions (pitch points) of the ridges or peaks of two adjacent pleats 4 facing each other.

If the S/So ratio is less than 3, increase in hydrogen permeation reaction area is not sufficient as mentioned above. Further, the pleats 4 are flattened, so there occurs a case where shape retention is not sufficiently achieved against pressure of a fed gas. If the S/So ratio is more than 10, rise of pleats 4 is sharp, so there arise a problem that a fed gas does not sufficiently spread into a space between the pleats. Therefore, the S/So ratio is preferably from 4 to 10, more preferably from 4 to 8.

The composite membrane material 1 of the present invention is a product obtained by superposing the thus constituted hydrogen-permeable membrane 2 and shape-retention mesh 3 and pleating at a predetermined pitch. The obtained product can be used as it is in the form of a plate. Alternatively, it can be used as a pleated cylinder wherein the product is formed into a cylindrical form such as circular cylinder or angular cylinder, as shown, for example, in FIGS. 3 and 4. For this purpose, the both ends are airtightly jointed by butt jointing or lap jointing. The shape and size thereof can be suitably set. In case of a plate type, it can be used, for example, as a plate-like hollow element prepared by, although not shown in the drawings, superposing two sheets of the membrane material 1 with keeping a space between them, and airtightly jointing peripheral edge portions of the superposed sheets with a frame inserted between them to give an integrated body. A hole for feeding a raw gas or a hole for taking out hydrogen gas is previously formed in the frame. As a method for bonding or jointing the hydrogen-permeable membrane 2 (or composite membrane material 1) applied in the above-mentioned forming and assembling, a thermal jointing method such as welding or brazing is preferred. In particular, brazing can be relatively easily carried out and, moreover, a bonding state of high sealing ability is obtained.

Figure 3:
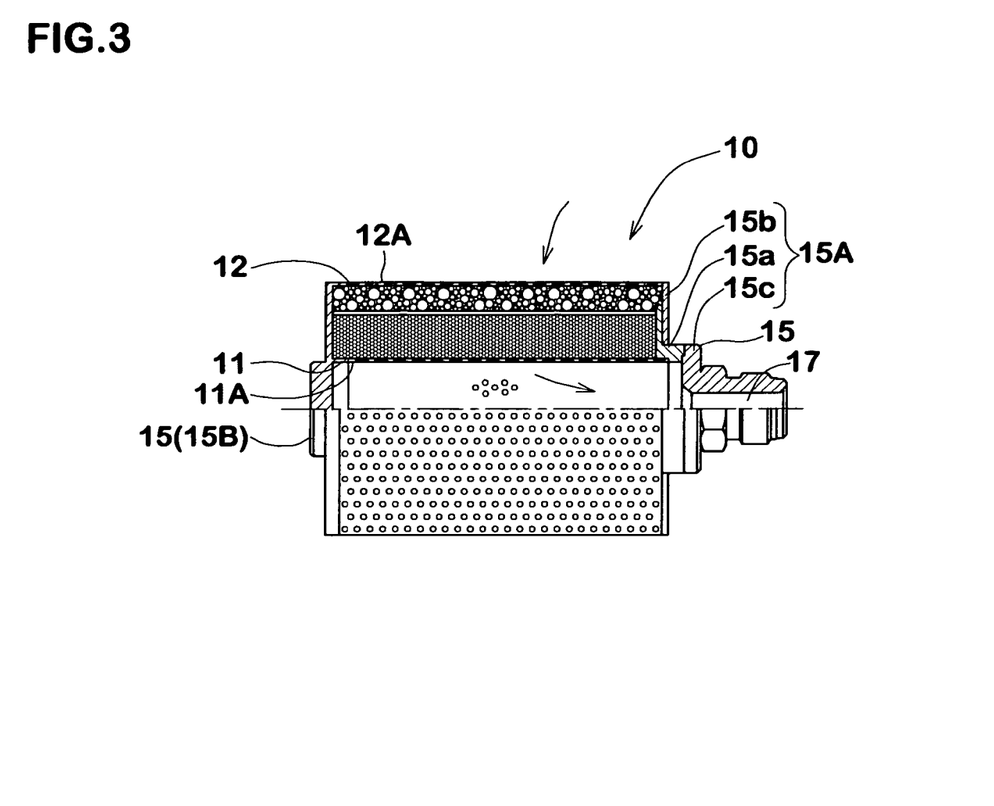
FIG. 3 is a front view of e hydrogen separation element, the upper half of which is shown as a cross sectional view.
Figure 4:
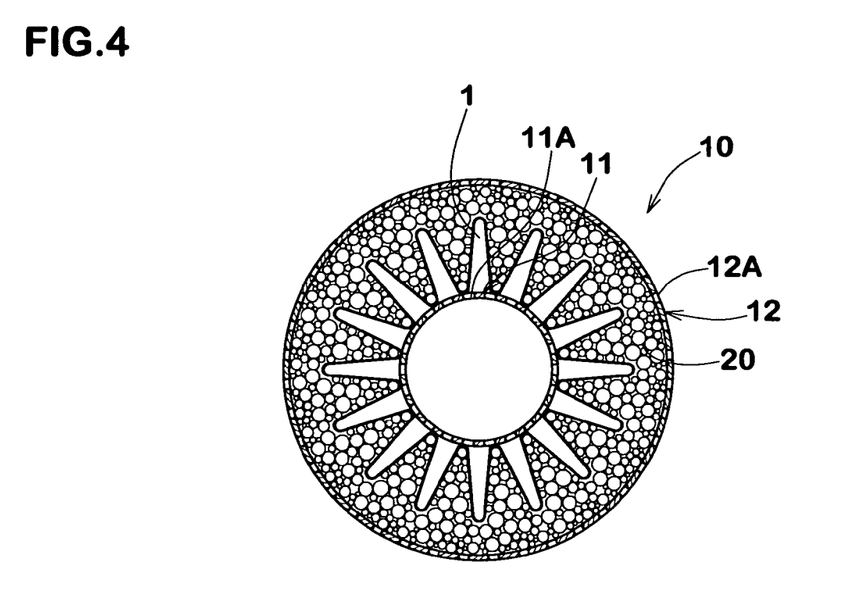
FIG. 4 is a cross sectional view of a body portion of the element.
Figure 5:
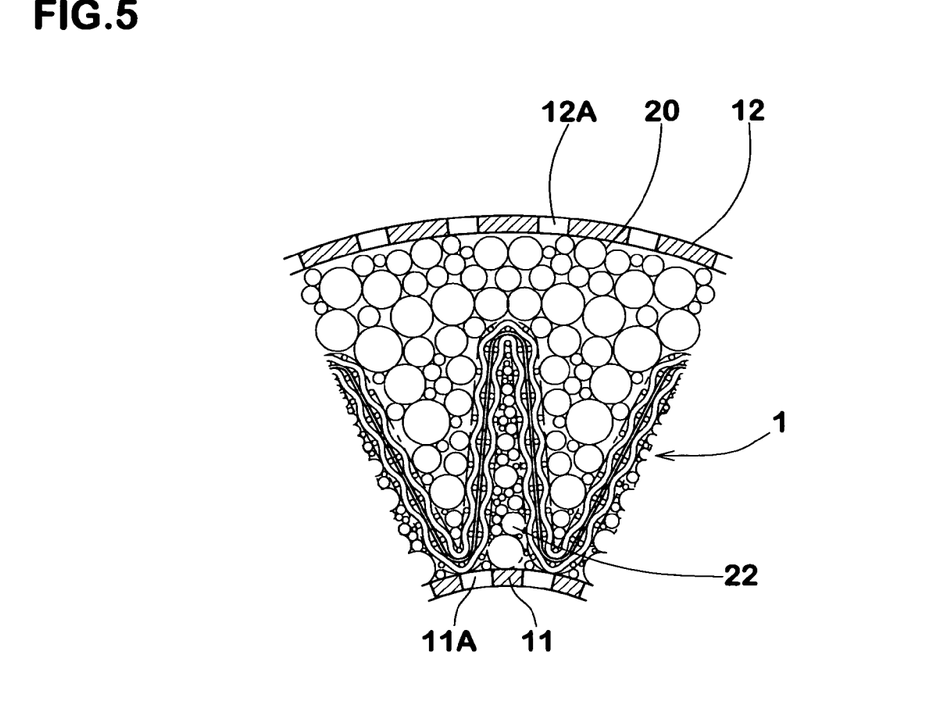
FIG. 5 is a cross sectional view showing valley portions in an enlarged form where a catalyst powder is used.

Referring to FIGS. 3, 4 and 5, there is shown therein an example of a hydrogen separation element 10 using a composite membrane material 1 formed into a cylindrical form as shown therein. There are used a porous inner cylinder 11 and a porous outer cylinder 12 which have been prepared by forming a punched plate into a cylindrical shape, a connecting fitting 15A as an end fitting 15 to be fixed to one end side of the cylinders, and a sealing fitting 15B as an end fitting 15 for closing the other end side. Therefore, for example, the porous inner cylinder 11 is inserted airtightly into the bore of the composite membrane material 1, and the sealing fitting 15B is concentrically disposed. The inner surface of the sealing fitting 15B and the facing end surface of the composite membrane material 1 are welded without causing any leak. It is also possible to hermetically join the inner surface of the sealing fitting 15B to the composite membrane material 1 by heating from the outer surface of the sealing fitting 15B. In that case, it is also possible to previously weld the porous inner cylinder 11 and the porous outer cylinder 12 to the inner surface of the sealing fitting 15B.

In this example, the connecting fitting 15A comprises an inner member 15a, a ring-like outer member 15b and a ferrule 15c. The inner member 15a is welded to the facing end surfaces of the porous inner cylinder 11 and the composite membrane material 1. The outer member 15b comprises a ring body which is joined to a flange of the inner member 15a and which closes a space between the inner member and the porous outer cylinder 12. The ferrule 15c is joined to the inner member 15a, thereby forming a taking out hole 17 which is communicated with the bore of the porous inner cylinder 11. The ferrule 15c is contiguously provided with a hexagon nut portion and an outside screw portion for connection. These are integrally formed, for example, by welding respective joint portions thereof to each other.

In such construction, a fed hydrogen-containing raw mixed gas is introduced from openings or holes 12A provided in the porous outer cylinder 12, as shown by arrows in FIG. 3. Only hydrogen separated by the hydrogen-permeable membrane 2 is taken out from openings or holes 11A of the porous inner cylinder 11, and is fed to the next step from the taking out hole 17 of the connecting fitting 15A. The raw mixed gas may be fed in the reverse direction, that is, may be fed from the porous inner cylinder 11 toward the porous outer cylinder 12. In the present invention, in case of sending out the hydrogen gas from the taking out hole 17, a catalyst 20 for reforming the mixed gas may be disposed on the primary side of the composite membrane material 1, that is, in a space between the composite membrane material 1 and the porous outer cylinder 12. Further, as shown schematically in FIG. 5, the catalyst 20 can also be charged in a space between the porous inner cylinder 11 and the secondary side of the composite membrane material 1. In that case, the catalyst 20 serves as a supporting material 22 for supporting the composite membrane material 1 and retaining the shape thereof. When it is desired to use the supporting material 22 only for the purpose of supporting and shape retention, an alumina powder or the like can also be used.

Attachment or joining of these end fittings 15, composite membrane material 1, porous inner cylinder 11 and porous outer cylinder 12 can be made by welding, besides brazing. A silver solder can be suitably used for brazing. The assembling is carried out, for example, by setting the porous inner cylinder 11 and the composite membrane material 1 fitted onto the cylinder 11 between the inner member 15a of the connecting fitting 15A and the sealing fitting 15B, and brazing them. Further, one end of the porous outer cylinder 15 is fixed to the sealing fitting 15B, whereby a gap is formed between a radial outward of the inner member 15a and other end of the porous outer cylinder 12. A vacant room is formed inside the porous outer cylinder 12, and a catalyst powder 20 is charged in the vacant room. Thereafter, the ring-like outer member 15b and the ferrule 15c may be attached.

The silver solder has a relatively low melting point and, therefore, it is not required to heat at a high temperature. Further, since silver may be a base component of a hydrogen-permeable membrane 2 itself, it does not substantially impair the hydrogen permeability. Further, the shape and structure of this end fitting is merely an example and do not restrict the present invention, and conventionally known various shapes and structures other than the above-mentioned are included.

The size and shape of the hydrogen separation element 10 can be determined in consideration of use conditions and installation space or location. For example, in general, the element having an outer diameter of about 5 to about 30 cm and a length of about 5 to about 50 cm is relatively easy to use. However, the element is not limited thereto, and can be modified to those having various sizes or non-circular shapes such as angular shapes in section, as occasion demands.

In this example, a cylinder having a circular cross section formed from a perforated steel plate such as a punched plate is used a porous inner cylinder 11 or a porous outer cylinder 12. Instead thereof can be used porous cylinders having various configurations, e.g., a mesh material such as woven wire mesh or expanded metal, and a porous metallic sintered body. In particular, cylinders made of a perforated steel plate or a mesh material are easily used since they are inexpensive and have sufficient strength and openings. On the other hand, in case of using a sintered body of a metallic powder or the like, for example, as the porous outer cylinder 12, it exhibits a function as a pre-filter for previously removing impurity particles in a fed hydrogen mixed gas. For this purpose, there can be used sintered bodies prepared from a metallic powder of # about 140/200 to about 200/250 or a metallic fiber having a fiber diameter of about 10 to about 30 μm.

Like this, the porous inner cylinder 11 and the porous outer cylinder 12 are used, as occasion demands. Therefore, as shown in this example, the both can be formed from perforated steel plates of the same kind. Either one of the porous inner and outer cylinders 11 and 12 can be replaced with other member such as a sintered body as mentioned above. The size of the openings 11A and 12A formed in the porous inner and outer cylinders 11 and 12 are, for example, such that a gas fluid can freely pass through them and can retain the catalyst powder 20 and the composite membrane material 1. In order to surely retain the catalyst powder, a fine mesh or the like can be further disposed inside the porous outer cylinder 12.

For the porous inner and outer cylinders 11 and 12 are selected a metal material which does not react with a hydrogen mixed gas to be treated, even when the hydrogen-permeable membrane 1 or the catalyst powder is heated. For example, stainless steel having an excellent hydrogen brittleness resistance, a cobalt alloy and a titanium alloy are relatively suitably used. A stainless steel, particularly an austenite stainless steel having a nickel equivalent of at least 26%, preferably 27 to 30%, is also effective. It can be preferably used also from the viewpoints that treatment such as welding or brazing is relatively easy and the corrosion resistance is good.

The nickel equivalent is a value showing stabilization of austenite and is obtained, for example, from the following equation.

$$\text{Ni equivalent} = Ni + 0.65Cr + 0.98Mo + 1.05Mn + 0.35Si + 12.6C$$

In the present example, the shape retention mesh 3 disposed on the primary side of the hydrogen-permeable membrane 2 serves to prevent the porous outer cylinder 12 and the catalyst powder 20 filled on the primary side from coming into direct contact with the hydrogen-permeable membrane 2. When shape-retention meshes 3 are disposed on both the primary and secondary sides as shown in FIG. 5, the supporting material 22 can be charged in a space between the porous inner cylinder 11 and the secondary side of the hydrogen-permeable membrane 2, as stated above.

Further, in case of filling the catalyst powder 20, the porous outer cylinder 12 has a somewhat larger diameter as in the present invention, whereby the catalyst powder 20 can be filled in spaces formed between adjacent ridge portions of the pleats 4 and a space between the ridge tops and the outer cylinder 12. Thus, the pleats 4 can extend outwardly.

Like this, in the present invention, the catalyst powder 20 may be used, as occasion demands. The kind and amount thereof can be suitably determined. The catalyst powder 20 causes, for example, the following reactions: $CH_4 + 2H_2O \rightarrow 4H_2 + CO_2$ when the raw gas is a hydrocarbon, and $CH_3OH + H_2O \rightarrow 4H_2 + CO_2$ when the raw gas is methanol. The produced $H_2$ gas is selectively separated through the hydrogen-permeable membrane 2. Usually, a particulate catalyst having, for example, a particle size of several hundreds of micrometers to several millimeters is used as the catalyst powder 20. Examples thereof are, for instance, those containing a Group VIII metal such as Fe, Co, Ni, Ru, Rh or Pt; NiO; and the like. The amount of the catalyst powder is determined in consideration of the kinds and configurations of raw gas and catalyst powder, the feeding and treating conditions of raw gas, and the like.

Figure 6:
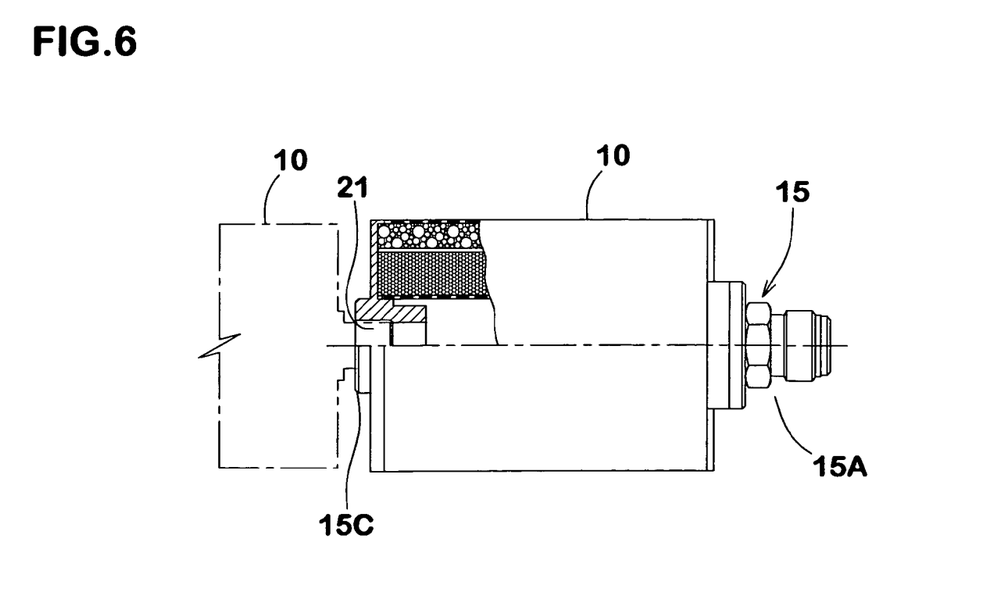
FIG. 6 is a front view of an embodiment of the hydrogen separation element, the upper half of which is shown as a cross sectional view.
Figure 7:
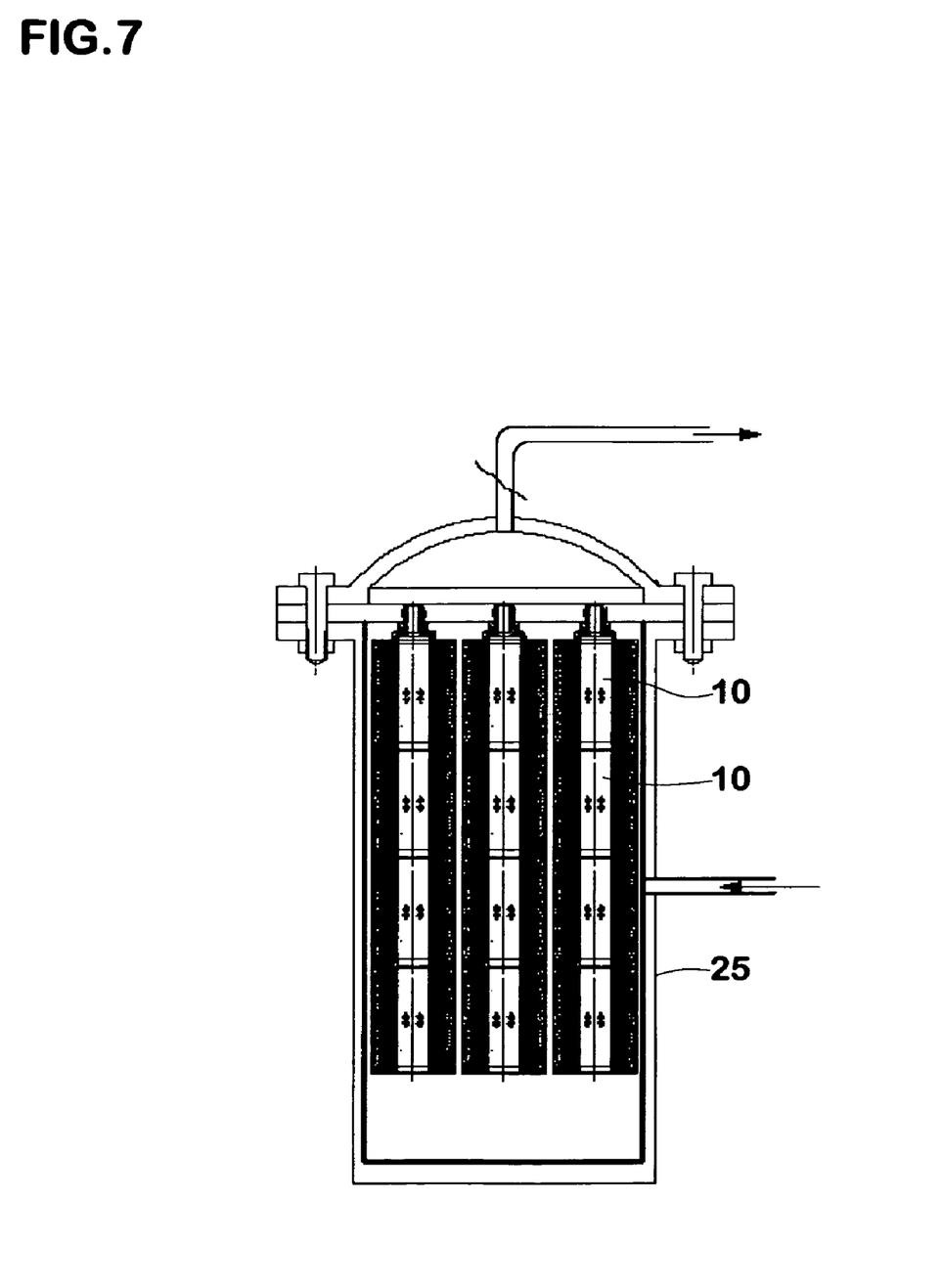
FIG. 7 is a cross sectional view showing an embodiment of a membrane former formed by arranging parallel to each other a plurality of modules each in which a plurality of the hydrogen separation elements are jointed to each other.

In the hydrogen separation element 10 shown in FIG. 3, for example, the sealing fitting 15B may be replaced with a receiver fitting 15C having a threaded screw hole 21, as shown in FIG. 6. The threaded screw hole 21 of the receiver fitting 15C and the outside screw portion of the connecting fitting 15A can screw together. Further, an end fitting for communication can be provided by directly welding end fittings together instead of using the sealing fitting 15B. Further, for example, as shown in FIG. 7, a module in which a plurality of the elements 10 are joined is formed, and a plurality of the modules are fixed in rows to a single large size plate and are placed in a large cylinder 25. Thus, the elements are plumbed to provide a large capacity membrane reformer for hydrogen separation.

Further, for example, the element 10 may be provided with general-purpose ring-like end fittings at its both end faces and be stored as a standard article. Thereafter, other fittings for connection and sealing are attached to the general-purpose end fittings (not shown) each time upon use, as occasion demands, to give an element 1. Further, when catalyst powder 20 and supporting material 22 are previously filled in the elements, inventory control of the elements is easy. Further, the element may be of a connection type as shown in FIG. 6, or may be connected to give a hydrogen separation member of a large capacity type as shown in FIG. 7. Thus, the element can be variously utilized as a compact and simple high-purity hydrogen generator in a wide range of field such as fuel cell, semiconductor, optical fiber and the like.

EXAMPLE 1

A Pd-25% Ag metal foil having a size of 100 mm width×1 m length was prepared by cold rolling to a thickness of 20 μm and heat treatment at 1,050° C. to give a hydrogen-permeable membrane. Shape-retention meshes (#100) made of a molybdenum wire having a diameter of 0.2 mm were superposed on the both surfaces of the membrane, and the resulting laminate is set up in a pleat forming machine. This three-layer laminate was pleated to form continuous pleats having a ridge height of 20 mm and a center pitch of 6.5 mm, thus providing a pleated composite membrane material. A Pd—Ag alloy plate which was purified by vacuum melting to a purity of 99.91% and processed by repeating rolling and heat treatment was used as a raw material of the above-mentioned Pd—Ag alloy.

In this state, the hydrogen-permeable membrane and the shape-retention meshes were in close contact with each other, although they were in a non-bonded state. Return such as spring back was scarcely observed and pleat shape could be easily imparted. In this state, the membrane material had an elasticity as a whole, and pleat shape retention which could not be achieved by the hydrogen-permeable membrane alone was possible. Further, the membrane material had a good surface appearance without any transfer of a mark such as texture of the wire mesh to the surface of the hydrogen-permeable membrane.

Front and rear end portions (opposing end portions) of the laminate were overlapped with each other, and an Ag solder material having a thickness of 0.5 mm and a width of 2 mm was interposed between the overlapped end portions to braze them, thus forming a cylindrical body with pleats extending in the axial direction. In the brazed portion, the solder material completely filled a space between the wire mesh and the hydrogen-permeable membrane, so the end portions were bonded without any leak.

The thus obtained cylindrical body was used as a composite membrane material, and was fitted on a porous inner cylinder having an outer diameter of 32 mm, a thickness of 2 mm and a length of 100 mm made of a perforated stainless steel plate (SUS316L). Thereto were further attached a porous outer cylinder (outer diameter 80 mm) made of the same perforated plate, a connecting fitting and a sealing fitting, as shown in FIGS. 3 and 4, by brazing to give a hydrogen separation element.

In this state of the element, the permeation area of the membrane material itself was 0.1 m$^2$ and the pleat height was 20 mm, so the surface area of the membrane material was 6.1 times the surface area of a cylindrical shape having a radius identical to a length up to the middle points of the pleat height of the membrane material. Further, 7 modules each in which four elements were joined were arranged as shown in FIG. 7, and placed in a housing container having an outer diameter of 260 mm and a length of 460 mm to give a hydrogen separation device of 20 Nm$^3$/h. The reformer volume of the device was 0.024 m$^3$.

COMPARATIVE EXAMPLE

A Pd-25% Ag metal foil having a thickness of 20 μm was wound around the surface of a porous supporter having an outer diameter of 35 mm and a length of 1 m so as to give a membrane reformer of 20 Nm$^3$/h similar to that of the Example, and was placed in a container having an outer diameter of 300 mm and a length of 1,000 mm. The reformer volume of the thus obtained device was 0.078 m$^3$. The reformer volume ratio of Example 1 to Comparative Example is 1/3.2, and this result is based on a pleated structure according to the present invention.

(Test 1) Hydrogen Permeation-Heat Cycle Test

With respect to the both devices, hydrogen permeation was conducted for one hour under conditions of heating temperature 600° C. and pressure difference 0.1 MPa. Thereafter, the hydrogen gas was replaced with a N$^2$ gas, and a heating-cooling treatment was repeated 10 times to observe crack generation in the hydrogen-permeable membrane owing to temperature rise and drop. As a result, the both devices had the performances that the hydrogen permeation amount was 11 liters/minute per unit element and the purity was not less than 99.99%. Also, as to presence or absence of cracks in the hydrogen-permeable membrane, there was no leak of N$^2$ gas. Further, as to the device of the Example, it was confirmed that defects such as cracking did not generate. This is presumed to be based on that the hydrogen-permeable membrane is disposed between the shape-retention meshes in a non-bonded state and can move in a relatively free state.

(Test 2) Confirmatory Test for Diffusion Generation

In order to confirm presence or absence of diffusion accompanying the heat cycle test of test 2, the element of each device was disassembled, and the hydrogen-permeable membrane was cut off and subjected to Auger analysis of metal elements in the thickness direction. As a result, it was confirmed that since the hydrogen-permeable membrane in the product of the Example was isolated by the shape-retention meshes and since the meshes were made of a high-melting metal, diffusion to the hydrogen-permeable could be prevented and the original composition was maintained.

What is claimed is:

1. A composite membrane material for hydrogen separation comprising:

a hydrogen-permeable membrane which is selectively permeable to hydrogen and is formed by rolling to a thickness of 30 μm or less which is difficult for the membrane by itself to retain its shape, and a shape-retention mesh for retaining the shape of said hydrogen-permeable membrane, which is disposed on at least one side of said hydrogen-permeable membrane and which comprises a metal wire of a metal selected from high-melting metals which have a melting point higher than the melting point of said hydrogen-permeable membrane, wherein said hydrogen-permeable membrane and said shape-retention mesh are superimposed and subjected to a pleat processing to provide pleats continuously so that the S/So ratio is from 3 to 10 in which So is the area of a datum plane passing through the middle points in height of the pleats of said hydrogen-permeable membrane at the average height, and S is the surface area of the hydrogen-permeable membrane located within said datum plane.

2. The composite membrane material of claim 1, wherein said metal wire is a wire of a high-melting metal having a melting point of not less than 2,000° C.

3. The composite membrane material of claim 2, wherein said high-melting metals of said shape-retention mesh are metal wires of molybdenum having a thickness of at most 0.3 mm.

4. The composite membrane material of claim 2, wherein said pleats have a peak height H of 5 to 30 mm in the cross section thereof, and the pitch P which is a length of a straight line connecting the middle points in height of adjacent pleats is not more than 0.8 time the peak height.

5. A hydrogen separation element using a composite membrane material for hydrogen separation of claim 1, comprising a porous inner cylinder, said composite membrane material which is fitted onto said porous inner cylinder, and a porous outer cylinder wrapping said composite membrane material on the outer side thereof.

6. The hydrogen separation element of claim 5, wherein said porous outer cylinder and/or said porous inner cylinder are made of a punched plate or a wire mesh.

7. The hydrogen separation element of claim 5, wherein a connecting fitting is provided on at least one end face of said element in the length direction.

8. The hydrogen separation element of claim 5, wherein a catalyst is disposed, without coming into contact with the hydrogen-permeable membrane through the interposing shape-retention mesh, in a space which is located on a primary side into which a mixed gas from which hydrogen permeates the hydrogen-permeable membrane is introduced, and which is located between said porous outer cylinder or porous inner cylinder and the shape-retention mesh.

9. The composite membrane material of claim 3, wherein said pleats have a peak height H of 5 to 30 mm in the cross section thereof, and the pitch P which is a length of a straight line connecting the middle points in height of adjacent pleats is not more than 0.8 time the peak height.

10. A hydrogen separation element using a composite membrane material for hydrogen separation of claim 2, comprising a porous inner cylinder, said composite membrane material which is fitted onto said porous inner cylinder, and a porous outer cylinder wrapping said composite membrane material on the outer side thereof.

11. A hydrogen separation element using a composite membrane material for hydrogen separation of claim 3, comprising a porous inner cylinder, said composite membrane material which is fitted onto said porous inner cylinder, and a porous outer cylinder wrapping said composite membrane material on the outer side thereof.

12. A hydrogen separation element using a composite membrane material for hydrogen separation of claim 4, comprising a porous inner cylinder, said composite membrane material which is fitted onto said porous inner cylinder, and a porous outer cylinder wrapping said composite membrane material on the outer side thereof.

13. The hydrogen separation element of claim 6, wherein a connecting fitting is provided on at least one end face of said element in the length direction.

14. The hydrogen separation element of claim 6, wherein a catalyst is disposed, without coming into contact with the hydrogen-permeable membrane through the interposing shape-retention mesh, in a space which is located on a primary side into which a mixed gas from which hydrogen permeates the hydrogen-permeable membrane is introduced, and which is located between said porous outer cylinder or porous inner cylinder and the shape-retention mesh.

15. The hydrogen separation element of claim 7, wherein a catalyst is disposed, without coming into contact with the hydrogen-permeable membrane through the interposing shape-retention mesh, in a space which is located on a primary side into which a mixed gas from which hydrogen permeates the hydrogen-permeable membrane is introduced, and which is located between said porous outer cylinder or porous inner cylinder and the shape-retention mesh.

16. The composite membrane material of claim 1, wherein said metal wire has a high modulus of elasticity of 250,000 to 350,000 $N/mm^2$.

17. The composite membrane material of claim 1, wherein said metal wire has a yield strength of 400 to 600 $N/mm^2$.

18. The composite membrane material of claim 16, wherein said metal wire has a yield strength of 400 to 600 $N/mm^2$.

* * * * *